US012571497B2

(12) United States Patent
Saunders

(10) Patent No.: US 12,571,497 B2
(45) Date of Patent: Mar. 10, 2026

(54) MOUNTING SYSTEM

(71) Applicant: Saeng/T.A. Corp., Columbus, NE (US)

(72) Inventor: Charles A. Saunders, Columbus, NE (US)

(73) Assignee: Saeng/T.A. Corp., Columbus, NE (US)

( * ) Notice: Subject to any disclaimer, the term of this patent is extended or adjusted under 35 U.S.C. 154(b) by 181 days.

(21) Appl. No.: 18/410,378

(22) Filed: Jan. 11, 2024

(65) Prior Publication Data

US 2024/0344651 A1 Oct. 17, 2024

Related U.S. Application Data

(60) Provisional application No. 63/479,597, filed on Jan. 12, 2023.

(51) Int. Cl.
| | |
|---|---|
| *F16M 11/12* | (2006.01) |
| *F16M 11/04* | (2006.01) |
| *B60R 11/00* | (2006.01) |
| *B60R 11/02* | (2006.01) |
| *B62J 11/00* | (2020.01) |

(52) U.S. Cl.
CPC .......... *F16M 11/12* (2013.01); *F16M 11/041* (2013.01); *F16M 11/046* (2013.01); *B60R 2011/0005* (2013.01); *B60R 11/0241* (2013.01); *B62J 11/00* (2013.01); *F16M 2200/02* (2013.01)

(58) Field of Classification Search
CPC .... F16M 11/12; F16M 13/022; F16M 11/041; F16M 11/08; F16M 2200/02; F16M 2200/024; B62J 11/00
USPC ......... 248/177.1, 178.1, 179.1, 187.1, 176.3, 248/220.21, 220.22, 220.41, 220.43, 248/221.11, 222.11, 222.12, 222.51
See application file for complete search history.

(56) References Cited

U.S. PATENT DOCUMENTS

| | | | | | |
|---|---|---|---|---|---|
| 1,422,513 | A | * | 7/1922 | Applas | F16B 5/00 |
| | | | | | 24/647 |
| 3,184,196 | A | * | 5/1965 | Dent | F16M 11/041 |
| | | | | | 403/381 |

(Continued)

*Primary Examiner* — Alfred J Wujciak
(74) *Attorney, Agent, or Firm* — Levenfeld Pearlstein, LLC

(57) ABSTRACT

A mounting system for mounting a device to an object includes a mount having a fixed portion, and a movable portion slidingly engaged with the fixed portion. The fixed and the movable portions defining a base, and when engaged with one another defining a circular profile. A lever is pivotally mounted to the fixed portion so as to operably engage the movable portion in a locked position and disengage from the movable portion in an unlocked position. A connector is operably engaged with the fixed portion. An indexed adjusting system has a coin-shaped body having a series of circumferentially equally spaced semi-spherical projections on both sides of the body, and first and second series of circumferentially equally spaced dimples positioned on the fixed portion and on the connector, respectively. The semi-spherical projections on both sides of coin-shaped body engages the circumferentially equally spaced dimples positioned on the fixed portion and the connector, respectively. A fastener engage the fixed portion with the connector, such that a low torque on the fastener permits a smooth friction hold between the mount and the connector, a medium torque permits an indexed friction hold and a high torque is a fully locked condition of the mount and the connector.

20 Claims, 14 Drawing Sheets

(56)           References Cited

U.S. PATENT DOCUMENTS

| | | | | |
|---|---|---|---|---|
| 3,356,325 | A | * | 12/1967 | Robert ............... F16M 11/2021 |
| | | | | 396/419 |
| 4,929,973 | A | * | 5/1990 | Nakatani ............. F16M 11/041 |
| | | | | 396/419 |
| 9,243,739 | B2 | | 1/2016 | Peters |
| D852,681 | S | | 7/2019 | Peters et al. |
| D865,252 | S | | 10/2019 | Peters et al. |
| D870,718 | S | | 12/2019 | Peters et al. |
| D870,719 | S | | 12/2019 | Peters et al. |
| D873,812 | S | | 1/2020 | Peters et al. |
| D876,316 | S | | 2/2020 | Peters et al. |
| 10,569,717 | B2 | | 2/2020 | Peters et al. |
| D883,922 | S | | 5/2020 | Peters |
| 10,649,492 | B2 | | 5/2020 | Peters et al. |

* cited by examiner

MOUNTING SYSTEM

CROSS-REFERENCE TO RELATED APPLICATION DATA

This application claims the benefit of and priority to Provisional U.S. Patent Application Ser. No. 63/479,597, filed Jan. 12, 2023, titled, Mounting System and Method, the disclosure of which is incorporated here in its entirety.

BACKGROUND OF THE INVENTION

The present disclosure pertains to a mounting system. More particularly, the present disclosure pertains to a modular mounting system to mount a wide variety of items to a wide variety of surfaces and objects. The mounting system of the present disclosure is particularly suitable for mounting mobile devices, such as phones or tablets, radar detectors, as well as other items, such as mirrors, to vehicles, such as motorcycles or automobiles, but may be adapted, configured, and scaled for use in numerous other applications beyond mobile devices and vehicles.

Most mobile devices such phones and tablets are designed to be handheld and therefore require a mounting system to be fixed on a surface or object. For example, it may be desirable to mount a mobile phone to a car dashboard or on a handlebar or fairing of a motorcycle. The mounting system therefore requires a connection to the mobile device and a connection to the surface or object while providing a way for the mobile device to be positioned in different configurations for using the mobile device. The mounting system thus may have different joints or linkages that allow the mobile device to be oriented and moved to a certain position relative to the surface or object. For example, the angle of a screen on a phone may be changed to avoid glare or the orientation of the screen can be changed to increase/change the viewing area. Likewise, the angle and/or orientation of a mirror may be changed to adjust for better visibility.

It also will be appreciated that the connection between the mobile device, mirror, or the like (collective mounted item or item) and the mount should be a secure connection that is easy to use and readily permits changing the position and/or orientation of the mounted item. In prior art mounting systems, the joints or linkages may be difficult to adjust, if they are adjustable at all, and may require additional tools to allow the mounted mobile device to be repositioned. Additionally, in some prior art mounting systems, connections to the mobile device may use complex locking mechanisms or magnetic connections. Further, many such mechanisms and connections generally prevent multiple mounting systems from being used to hold large devices. For example, a large device such as a tablet may require multiple mounts connected to the tablet to provide sufficient support between the tablet and the surface or object to which it is mounted.

More notably, prior art mounting systems generally have limited options for adjusting the joints or linkages and for securing the mount to the surface or object. That is, the joints or linkages in prior art mounting systems generally offer a limited range of movement—either unlocked, i.e., movable, or locked, i.e., immovable. Moreover, many prior art mounting systems do not provide flexibility to allow the mount to be secured to a variety of surfaces or objects. Similarly, many prior art mounting systems are not modular, and therefore lack the flexibility for customization to work in unique or non-traditional mounting situations.

Accordingly, there is a need for a mounting system that allows for secure and easy mounting and adjustment of mobile devices and other items to a large variety of surfaces and objects. Desirably, such a mounting system is modular and allows the mounting system to be custom-configured to work in a wide variety of unique or non-traditional mounting situations. More desirably still, such a mounting system provides the user a way to custom-set the resistance of the joints or linkages in a full range from a smooth friction hold, to an indexed friction hold, to a fully locked hold, to enable the user to set the resistance to their needs whether it is to allow for easy repositioning or set in the fully locked position.

SUMMARY OF THE INVENTION

Examples of the present disclosure provide a mounting for secure and easy mounting and adjustment of mobile devices and other items to a large variety of surfaces and objects.

In one aspect, the mounting system includes a mount having a fixed portion, and a movable portion. The movable portion is slidingly engaged with the fixed portion. The fixed portion and the movable portion define a base, and when engaged with one another, define a circular profile.

A lever is pivotally mounted to the fixed portion so as to operably engage the movable portion in a locked position and operably disengage from the movable portion in an unlocked position. In embodiments the fixed and movable portion, when engaged with one another, further define a circumferential recess. A resilient member can be positioned in the recess.

When the lever operably engages the movable portion in the locked position, the lever engages and exerts a force on the second resilient member, and when the lever operably disengages the movable portion in the unlocked position, the lever disengages from the second resilient member.

A connector is operably engaged with the fixed portion.

An indexed adjusting system has a two-sided coin-shaped body having a series of circumferentially equally spaced semi-spherical projections on both sides of the body. A first series of circumferentially equally spaced dimples is positioned on the fixed portion, a second series of circumferentially equally spaced dimples is positioned on the connector. The circumferentially equally spaced semi-spherical projections on both sides of the coin-shaped body are configured to engage the circumferential dimples positioned on the fixed portion and the connector, respectively. A second resilient member is positioned between the fixed portion and the connector, circumferentially outward of the two-sided coin shaped body.

A fastener engages the fixed portion and the connector. A low torque on the fastener permits a smooth friction hold between the mount and the connector, a medium torque on the fastener permits an indexed friction hold between the mount and the connector, the index friction hold being partial engagement of semi-spherical projections and the dimples, and a high torque on the fastener is a fully locked condition of the mount and the connector with full engagement of the semi-spherical projections and the dimples.

In embodiments, each dimple of the circumferentially equally spaced dimples are positioned about 10 degrees from adjacent dimples and each projection of the circumferentially equally spaced semi-spherical projections are positioned about 10 degrees from adjacent projections.

In embodiments, the fixed portion, and the movable portion mount each include at least one upwardly, inwardly oriented flange.

The mounting system can further include a mounting plate. The mounting plate includes outwardly oriented fingers configured for engagement with the fixed portion and movable portion upwardly, inwardly oriented flanges to secure the mounting plate to the fixed and/or movable portions. The mounting plate can be configured for attachment to an associated mobile device, such as a mobile phone, a tablet, or the like.

In embodiments, one or both of the fixed and movable portions includes a magnetic surface to facilitate mounting the mounting plate to the mount.

In embodiments, the connector is dampener, a linkage, a ganged mount, an extender, a handlebar mount, or the like, each including the indexed adjusting system.

In another aspect, the connector further includes first and second portions, and an indexed adjusting system between the first and second portions. The first and second portions are mounted to one another by a screw having a head and a nut, positioned in recesses in the first and second portions, respectively.

The recesses in one or both of the first and second portions are an other than round shape, and a cap is positioned over one or both of the screw head and the nut. The cap on the screw head has an opening therein to rotate the screw with the cap in place.

Other aspects and advantages will become more apparent from the following detailed description when taken in conjunction with the accompanying drawings.

BRIEF DESCRIPTION OF THE DRAWINGS

The benefits and advantages of the disclosed embodiments will become more readily apparent to those of ordinary skill in the relevant art after reviewing the following detailed description and accompanying drawings.

FIGS. 20-23 illustrate various types of mounts that use the mounting system mounted thereto;

FIGS. 24A-C are various views of parts of the connector or linkage shown in FIG. 20, disassembled to show an embodiment of the cap and button screw recesses;

DETAILED DESCRIPTION

Figure 1:
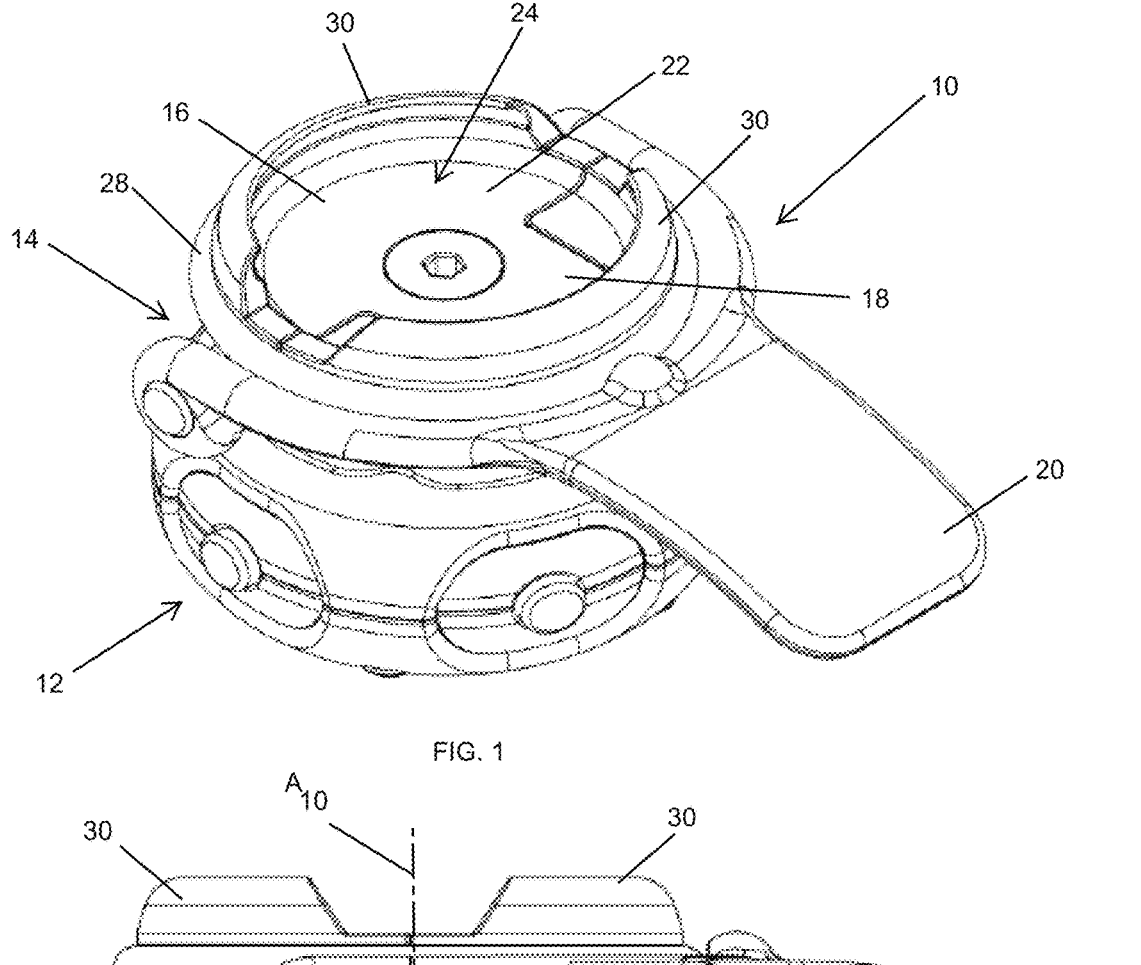
FIG. 1 is a perspective view of an embodiment of a mounting system including an optional dampener.

While the present disclosure is susceptible of embodiment in various forms, there is shown in the drawings and will hereinafter be described a presently preferred embodiment with the understanding that the present disclosure is to be considered an exemplification and is not intended to limit the disclosure to the specific embodiment illustrated.

Referring now to the figures, there is shown a mounting system that allows for secure but easy mounting of mobile devices and other items to a large variety of surfaces and objects. The illustrated mounting system is modular and allows the mounting system to be custom-configured to work in a wide variety of unique or non-traditional mounting situations. In embodiments the mounting system provides a user a way to custom-set the resistance of joints or linkages in a full range from a smooth friction hold, to an indexed friction hold, to a fully locked hold. This enables the user to set the resistance to their needs whether it is to allow for easy repositioning of the mounted item, or set the mounted item in a fully locked position.

Figure 2:
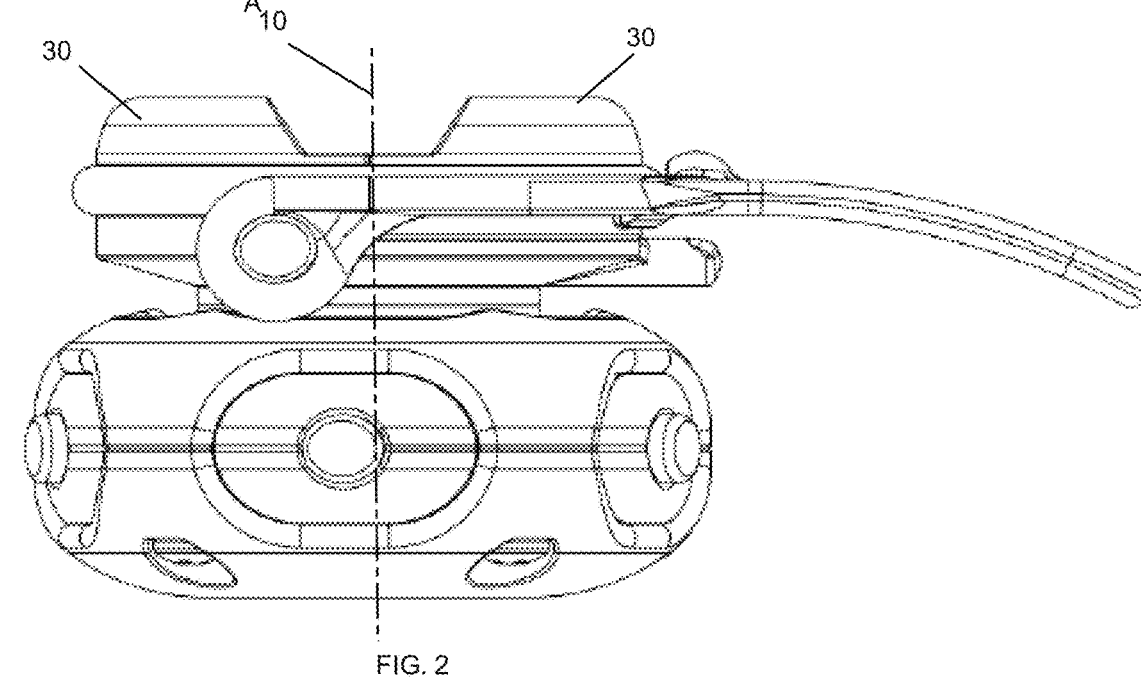
FIG. 2 is a side view of the mounting system.
Figure 3:
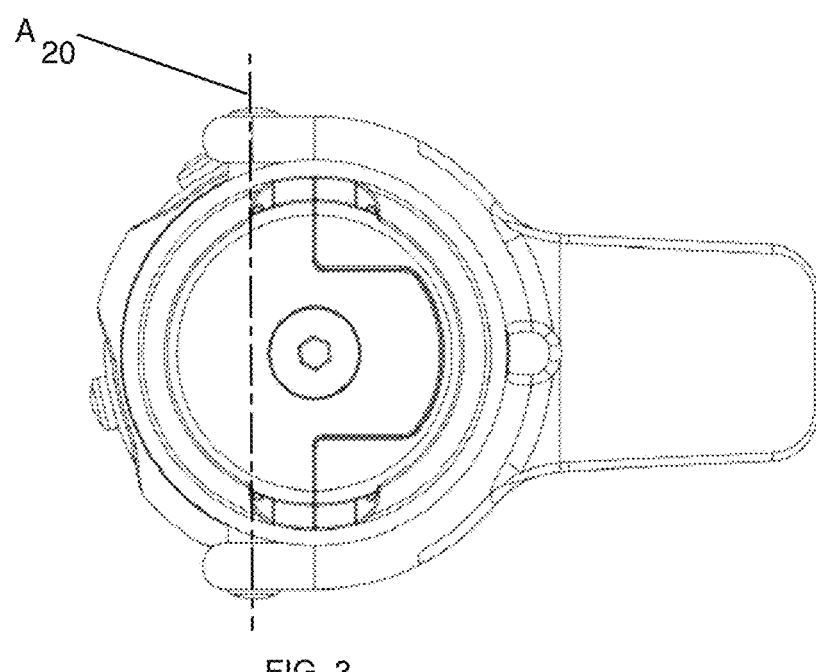
FIG. 3 is a top view of the mounting system.
Figure 4A:
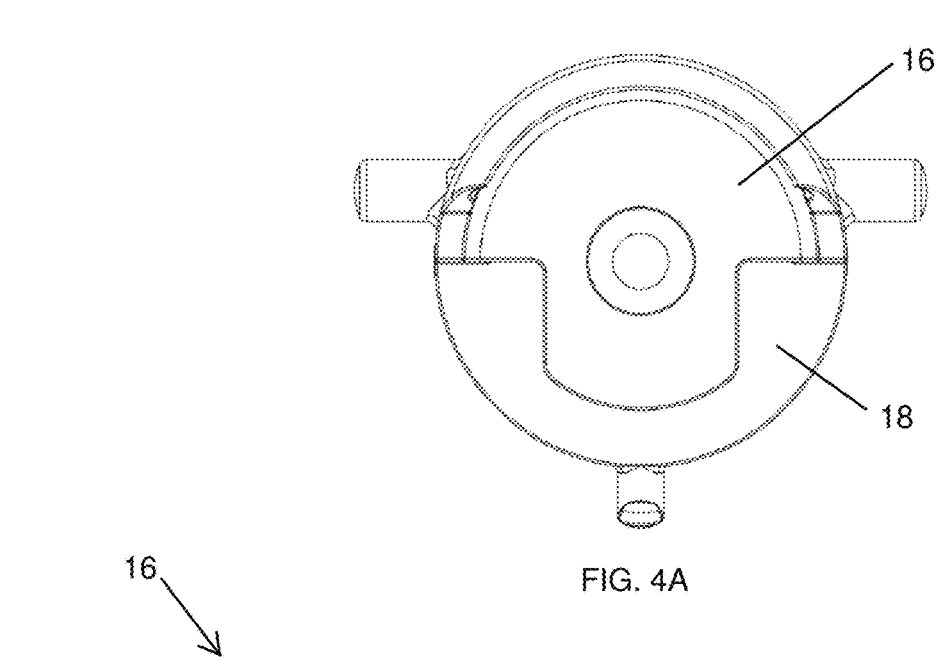
FIGS. 4A and 4B are top and side views of the fixed portion of the mounting system with the pivoting handle removed for ease of illustration.
Figure 4B:
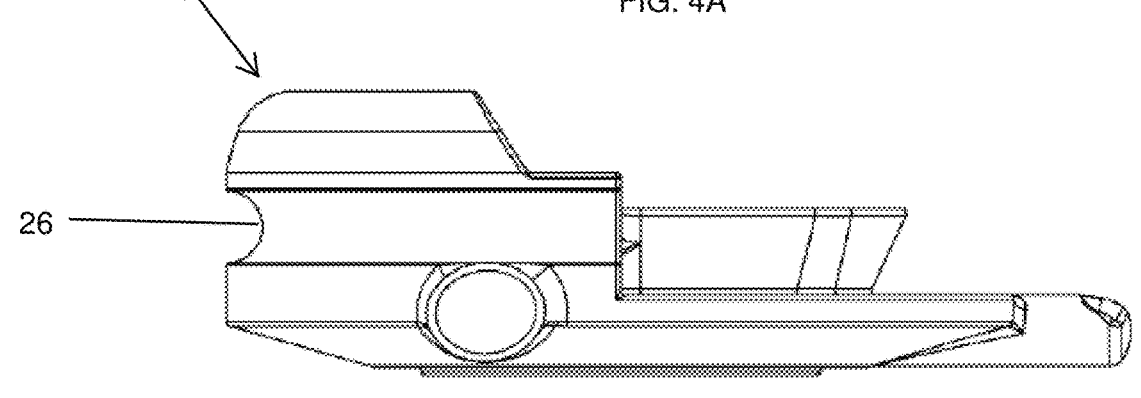

FIGS. 1-3 illustrate the mounting system 10 positioned on an optional dampener 12. The mounting system 10 includes, generally, a mount 14 having a fixed portion 16, a movable portion 18, and a handle or lever 20. The fixed and movable portions 16, 18 defining a base 22. The fixed and movable portions 16, 18, when mated to one another, define a circular profile. One or both of the fixed and movable portions 16, 18 can include a magnetic surface 24.

The movable portion 18 moves or slides toward and away from a center axis $A_{10}$ of the mounting system 10, or toward and away from the fixed portion 16. The lever 20 is mounted to the fixed portion 16 so as to pivot about an axis $A_{20}$ perpendicular to the mounting system center axis $A_{10}$. In an unlocked position, the lever 20 allows the movable portion 18 to move relative to the fixed portion 16 and in a locked position locks the movable portion 18 in place relative to the fixed portion 16. In a current embodiment, the upward lever 20 position locks the movable portion 18 in place relative to the fixed portion 16.

Figure 5:
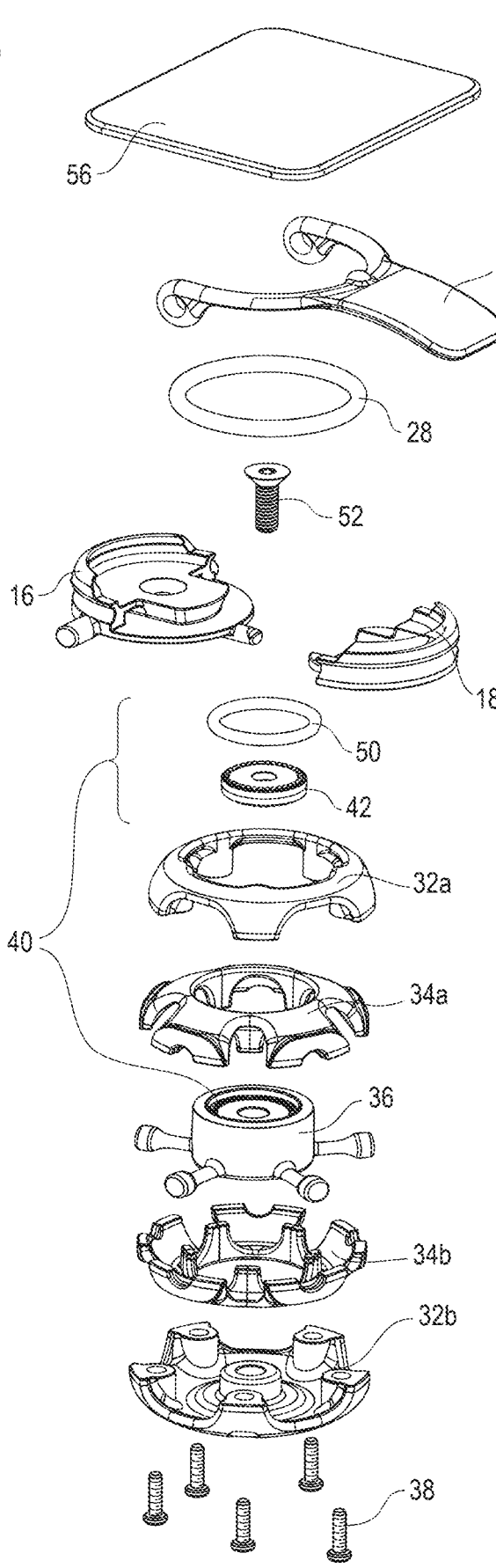
FIG. 5 is an exploded view of the mounting system and the optional dampener.
Figure 6:
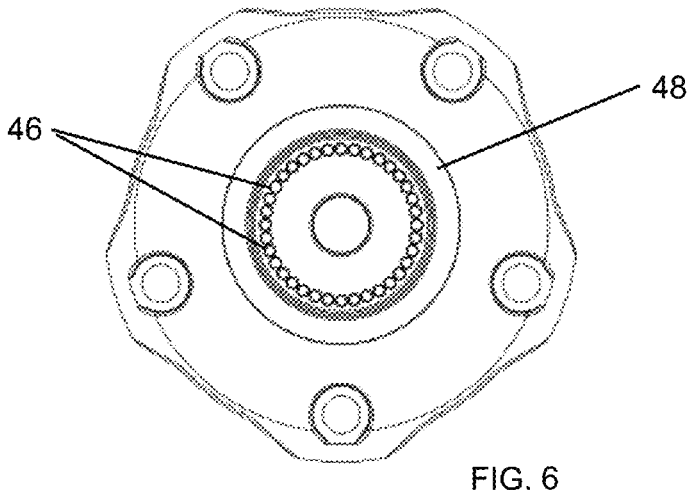
FIG. 6 is a top view of the dampener showing a dimpled portion of the indexed adjusting member.

Referring briefly to FIG. 5, the fixed and movable portions 16, 18 include circumferential recesses 26 that, when fixed and movable portion 16, 18 are mated to one another, are contiguous. As best illustrated in FIGS. 1 and 2, a resilient member 28, such as an O-ring is positioned in the recess 26 which urges the fixed and movable portions 16, 18 toward one another. The O-ring 28 also serves to facilitate locking the movable member 18 in place in the locked position as the lever 20 provides a force on the O-ring 28 when in the locked position. When the lever 20 is in the unlocked position, the O-ring 28 resiliency allows the movable portion 18 to be moved away from the fixed portion 16.

Figure 28:
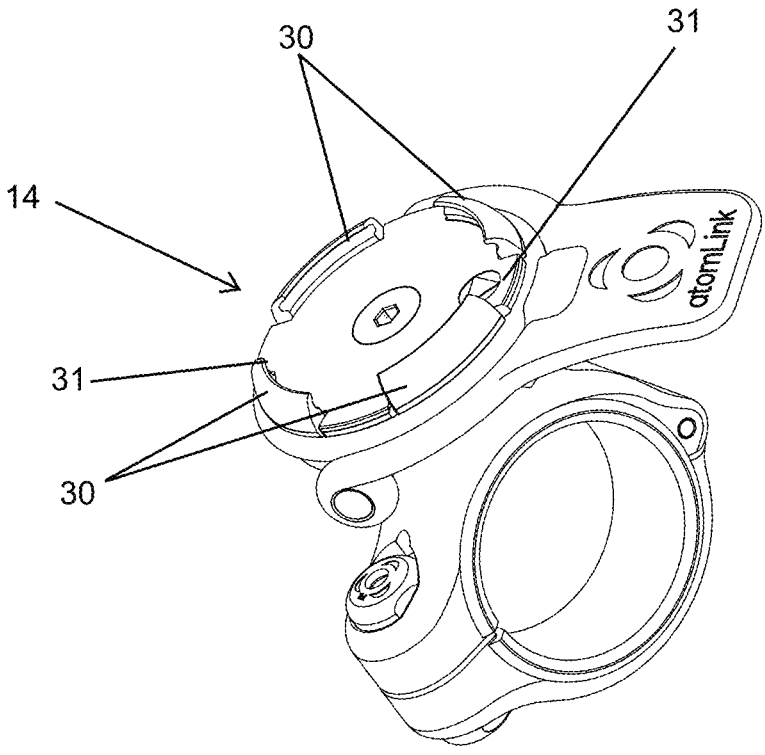
FIG. 28 is an illustration of an embodiment of a mount having four flanges on the fixed and movable mount portions.

The fixed and movable portions 16, 18 include upwardly, inwardly oriented flanges 30. As illustrated, the fixed and movable portions 16, 18 each include one large semi-circumferential flange 30 to define ports 31 between the flanges 30. It will be appreciated that the fixed and movable portions 16, 18 can include smaller (shorter) partial, spaced apart circumferential flanges, defining open ports between the flanges, as seen in FIG. 28. As will be described in more detail below, the flanges 30 permit securing the mounted item to the mounting system 10.

Referring now to FIG. 5, there is shown an exploded view of the mounting system 10 and optional dampener 12. The dampener 12 includes upper and lower outer housing portions 32a,b, upper and lower inner housing portions 34a,b, and a dampener member 36. The dampener housing portions 32a,b and 34a,b and dampener member 36 are secured together to form the dampener 12 by fasteners 36, such as the illustrated screws. Other fastening arrangements will be understood by those skilled in the art.

In one example, the mounting system 10 is mounted to the damper 12 by an indexed adjusting system 40. While the mounting system 10 is described in connection mounting to the damper 12 for purposes of explanation, as will be discussed in more detail below, the mounting system 10 can be used with a wide variety of components, linkages, connectors, and the like.

In an embodiment, the indexed adjusting system 40 includes a two-sided coin-shaped body 42 having semi-spherical projections 44 formed on both sides of the coin-shaped body 42 and a pair of circular dimpled portions 46. In the illustrated embodiment, one of the dimpled portions 46 is formed as part of the dampener 12, for example, as part of the dampener member 36, and the other dimpled portion 46 is formed as part of (on the bottom of) the mounting member fixed portion 16.

Figure 7A:
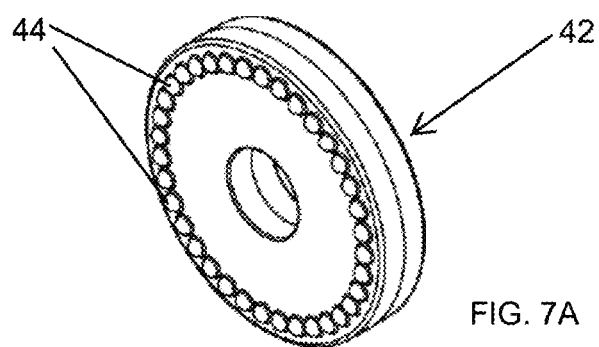
FIGS. 7A-7C are perspective, top and side views of a semi-spherical projection portion of the indexed adjusting member.
Figure 7B:
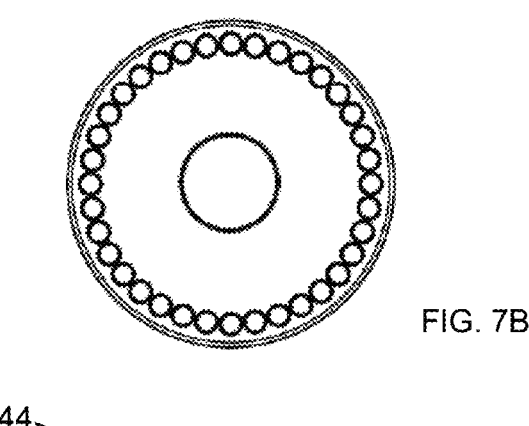
Figure 7C:
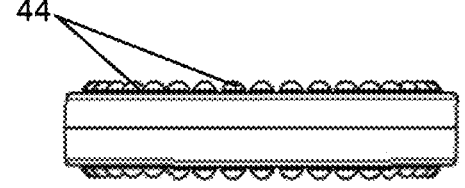
Figure 8:
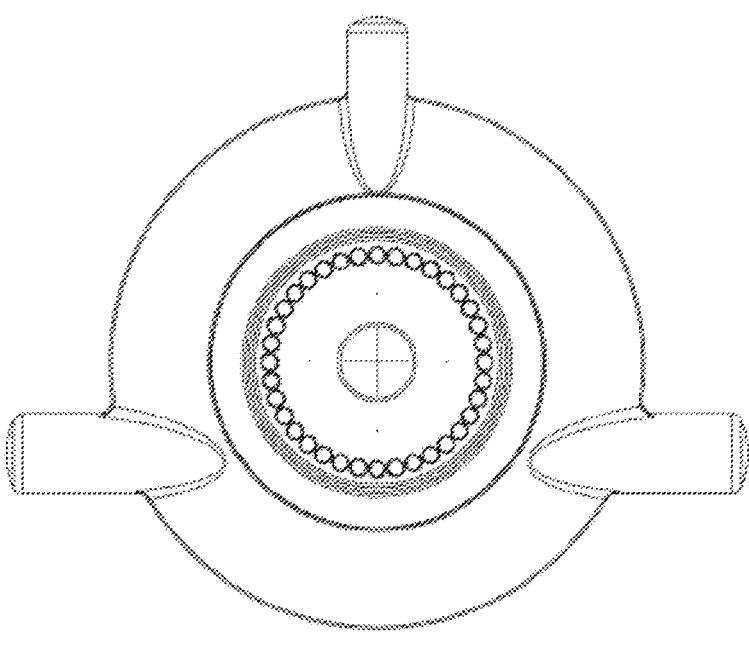
FIG. 8 is a bottom view of the mounting system with the handle removed for ease of illustration.
Figure 9:
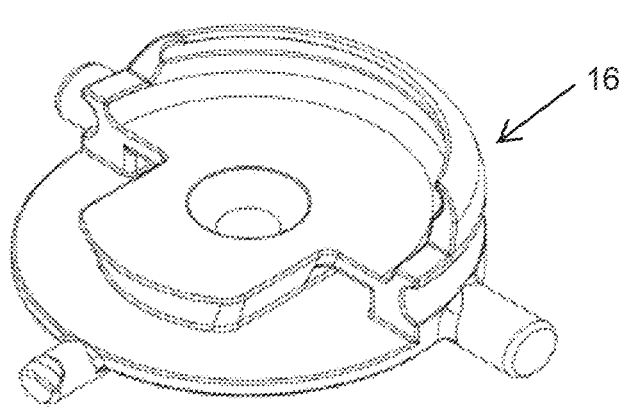
FIG. 9 is a perspective view of the fixed portion of the mounting system.
Figure 10:
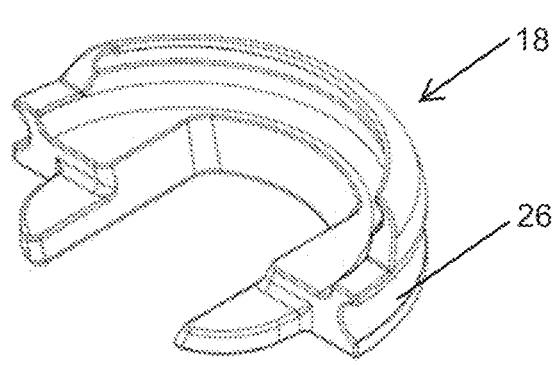
FIG. 10 is a perspective view of the movable portion of the mounting system.

FIGS. 7A-7C are perspective, top and side views of the coin-shaped body 42 with the semi-spherical projections 44. And, in the illustrated embodiment, the dimpled portions 46 of the dampener 12 and mounting member fixed portions 16 include circumferential recesses 48 outboard of the dimpled portions 46. An O-ring 50 is positioned in the recesses 48 and the mount 14 and dampener 12 are secured to one another by a fastener 52 to sandwich the coin-shaped body 42 between the dimpled portions 46 of the dampener 12 and mount 14 fixed portion 16 with the O-ring 50 in between. In a current embodiment the projections 44 and dimples 46 are formed circumferentially in the coin shaped by 42 and the dampener 36, respectively. Each the dimples 46 and the projections 44 are formed at about 10 degrees from one another. Other configurations/spacings of the dimples 46 and projections 44 are within the scope and spirit of the present disclosure.

In use, the fastener 52 is tightened to a desired torque. A slight tightening of the fastener 52 allows the mount 14 to be freely rotated about the dampener 12 such that there is a smooth friction hold between the mount 14 and the dampener 12. Increasing the torque (i.e., further tightening of the fastener 52) produces an indexed friction hold between the mount 14 and the dampener 12. That is, the projections 44 will ride in and engage the dimples 46, but the projections 44 will move from dimple 46 to dimple 46 thus still allowing rotating the mount 14 about the dampener 12. Still further increasing the torque (i.e., still further tightening of the fastener 52) will lock the projections 44 into respective dimples 46 to fully prevent rotation of the mount 14 relative to the dampener 12.

Figure 11:
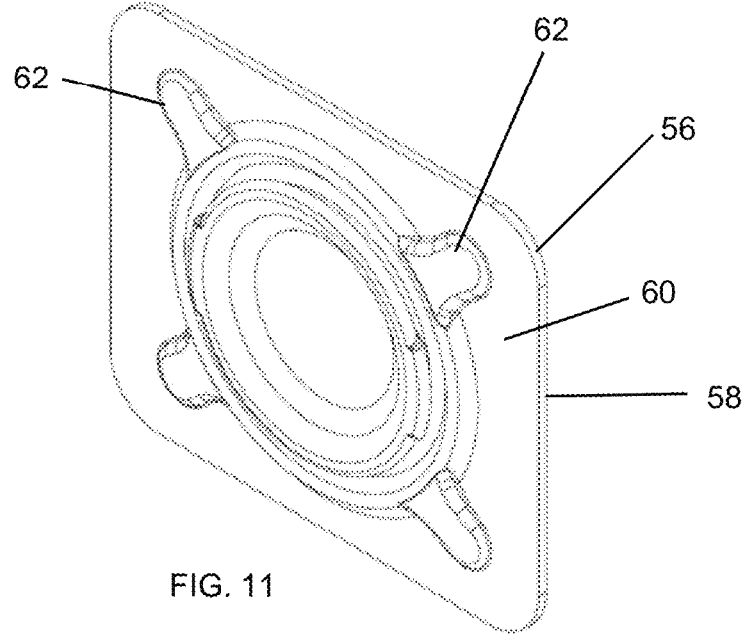
FIG. 11 is a perspective view of en embodiment of a mounting plate for mounting to a mounted item, such as a phone or tablet.

Referring briefly to FIGS. 5 and 11, there is shown a mounting plate 56 for the item to be mounted, e.g., the phone or tablet. The mounting plate 56 includes on one side a flat surface 58 to which the item to be mounted is adhered and on an opposite side 60, outwardly oriented fingers or nubs 62. The fingers 62 are spaced from the mounting plate surface 60, that is, there is a space between the extent of the fingers 62 and the surface 60, such that the fingers 62 lock into the fixed and movable portions upwardly, inwardly oriented flanges 30. This interlocking arrangement secures the mounting plate 56 in the mount fixed and movable members 16, 18. The mounting plate 56 can include magnetic a surface that cooperates with the mount fixed and/or movable portions 16, 18 to further secure the item to be mounted (by the mounting plate 56) to the mount 14.

Figure 27:
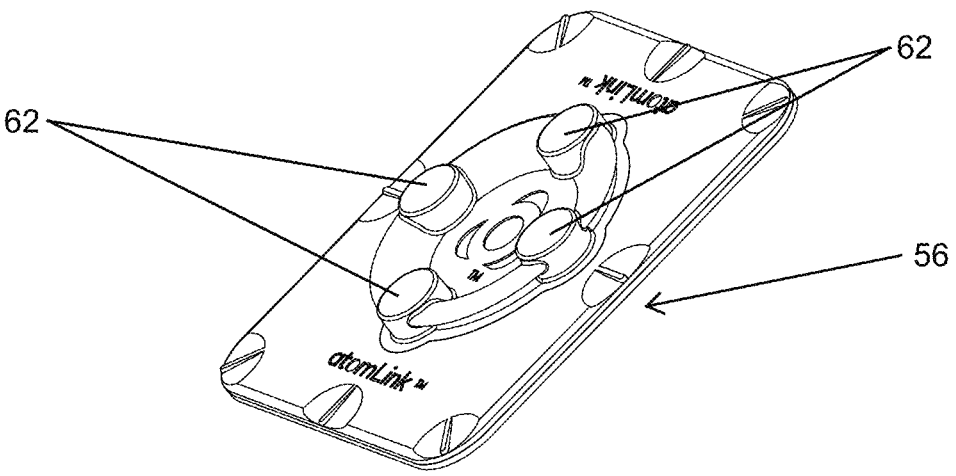
FIG. 27 is an illustration of an embodiment of a backing plate for mounting to a mobile device, the backing plate having four finger or nubs.

To secure the item (the mounting plate 56) to the mount 14, the lever 20 is positioned in the downward or unlocked position. The mounting plate fingers 62 are positioned under the fixed and movable mount portion flanges 30. If necessary or desired, the movable mount portion 18 can be urged away from the fixed mount portion 16 to increase the space to interlock the fingers 62 and flanges 30. The mounting plate 56 (the item to be mounted) can be rotated to a desired position and/or orientation of the item to be mounted. Once the desired position and/or orientation are set, and the mounting plate fingers 62 and the fixed and movable mount portion flanges 30 are interlocked, the lever 20 can be raised or moved into the locked position to secure the plate 56 and the item. As noted above and referring briefly to FIGS. 27 and 28, the mounting plate 56 can include, for example, four fingers or nubs 62 and the fixed and the mount 14 (the movable portions 16, 18) can include four flanges 30 and define ports 31 between the flanges 30. Such an arrangement readily facilitates rotating the mounted item between the portrait and landscape orientations without removing the item (and the plate 56) from the mount. The fingers 62 and/or flanges 30 can have rounded edges to readily rotate the plate 56 (and item) within the mount 14.

It will be appreciated that although the coin-shaped body 42 is shown as a separate member the components can be configured and fabricated with the dimples 46 and the projections 44 formed integrally with the various components.

Figure 12:
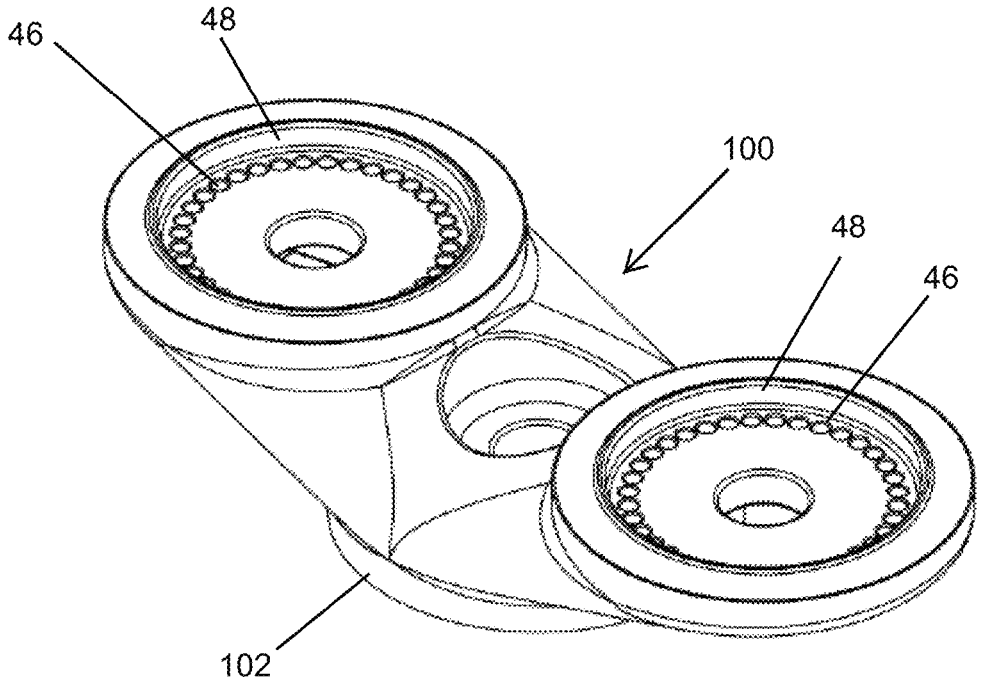
FIG. 12 shows a ganged mount portion.

FIGS. 12-22 illustrate various types of mounts that can incorporate the present mounting system. FIG. 12 illustrates a ganged mount 100 in which the dimpled portions 46 are formed in each side of the gang mount 100 and recesses 48 are formed circumferentially around an outer perimeter of the dimples 46 to accommodate an O-ring. A lower or base portion 102 of the mount 100 can likewise include a dimpled portion 46 so that the base 102, as well as each of the gang mounts 104 can incorporate the indexed adjusting system 40.

Figure 13:
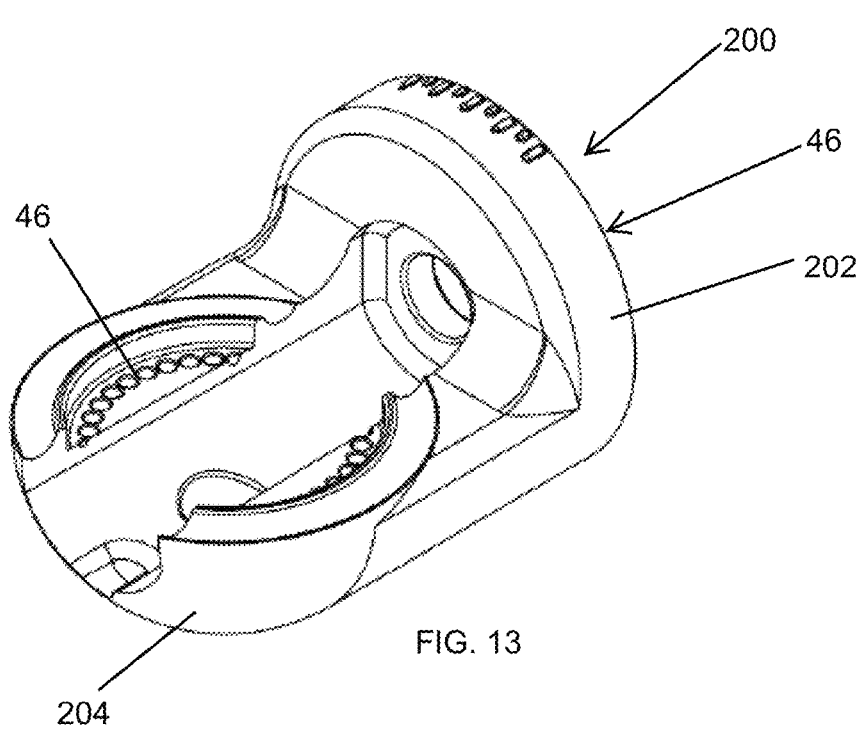
FIGS. 13-16 illustrate various linkages for use with the present mounting system.
Figure 14A:
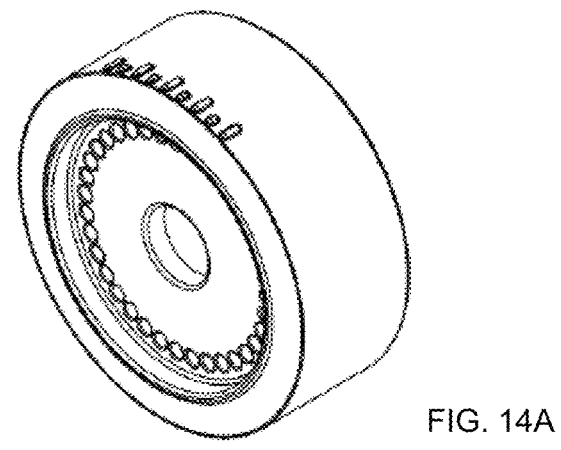
Figure 14B:
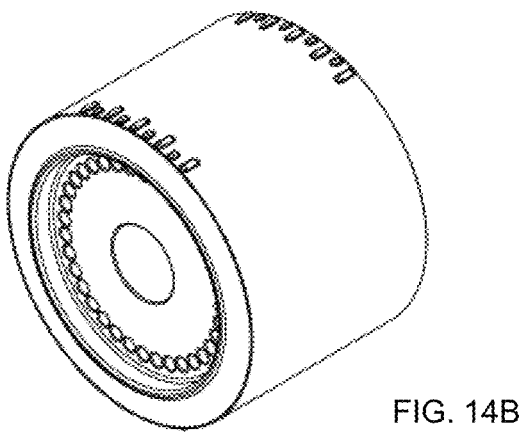
Figure 15:
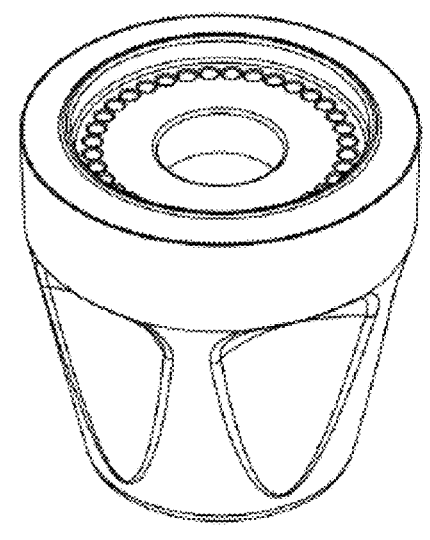
Figure 16:
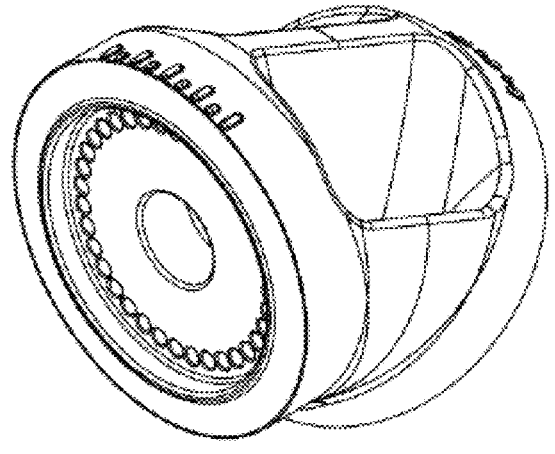

FIG. 13 illustrates a 90 degree mount 200, having base and leg members 202, 204. Here, both the base and leg members 202, 204 can be configured with dimpled portions 46 to accommodate the indexed adjusting system 40. FIGS. 14A,B through 16 are extenders that can include dimpled portions on one or both ends to accommodate the indexed adjusting system.

Figure 17:
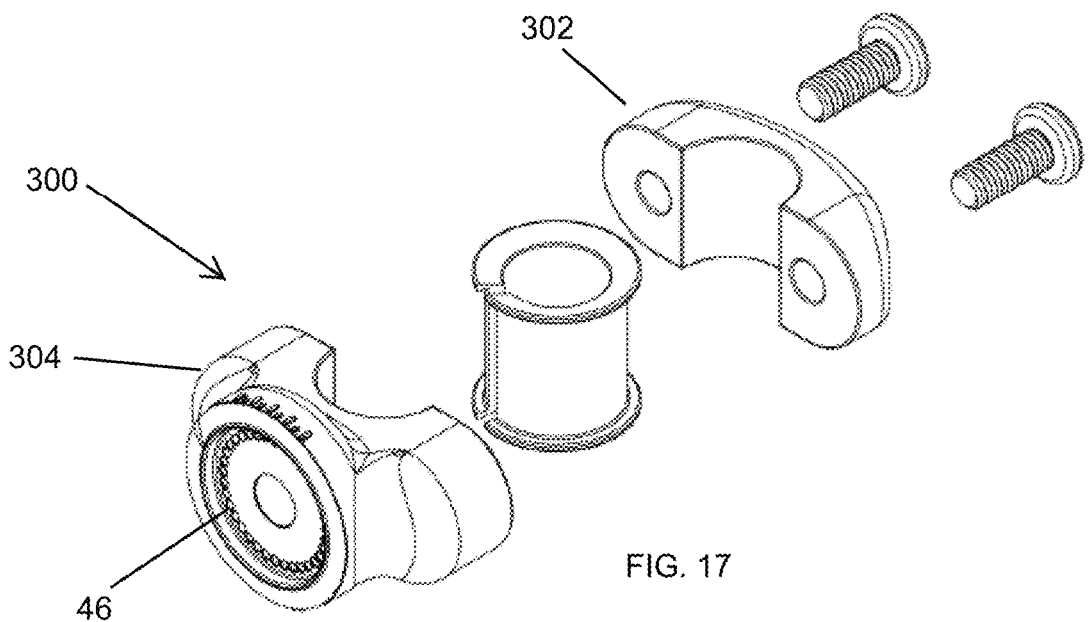
FIGS. 17 and 18 illustrate handle bar mounts for use with the present mounting system.
Figure 18:
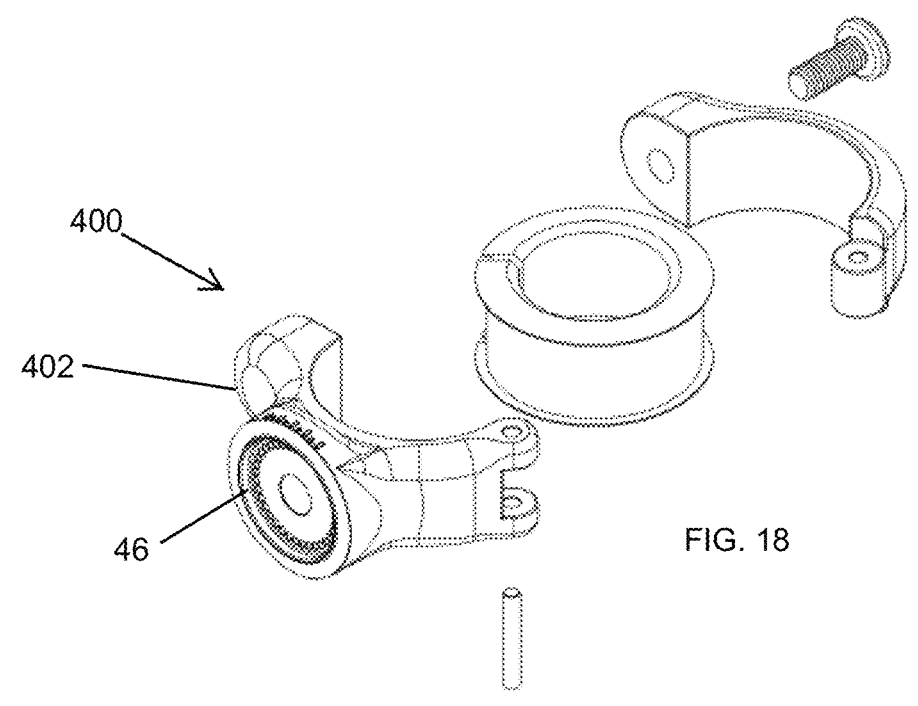
Figure 19:
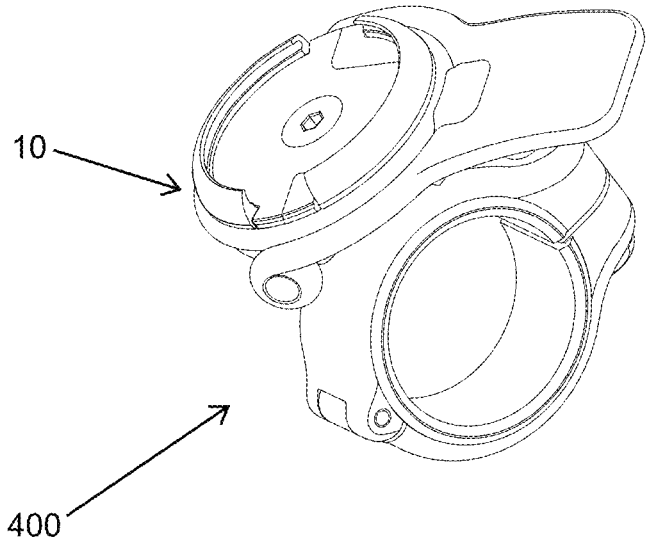
FIG. 19 illustrates the handlebar mount of FIG. 18 having the mounting system mounted thereon.
Figure 20:
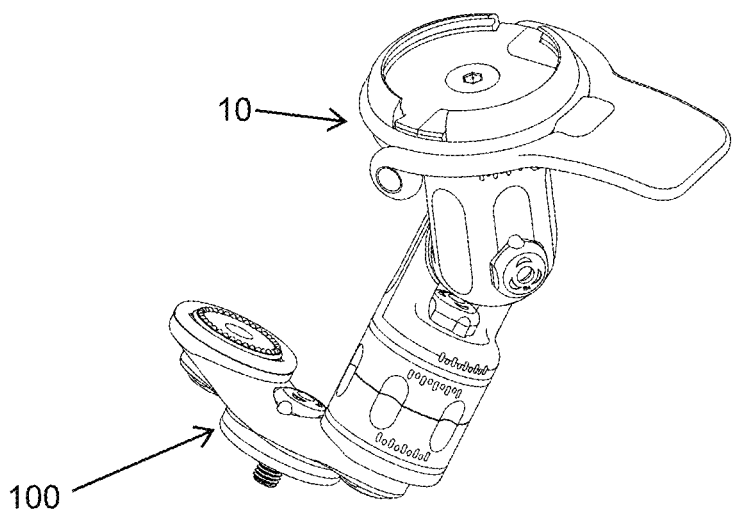
Figure 21:
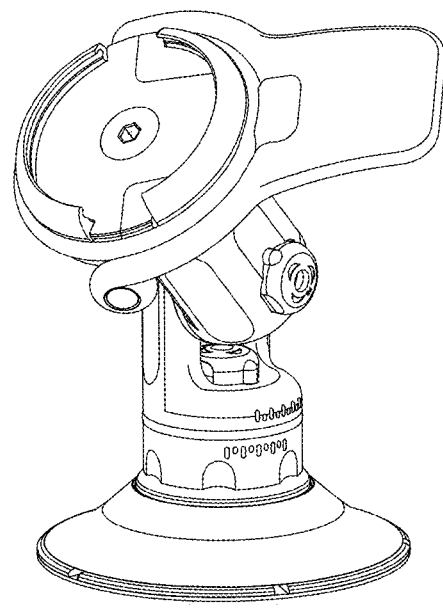
Figure 22:
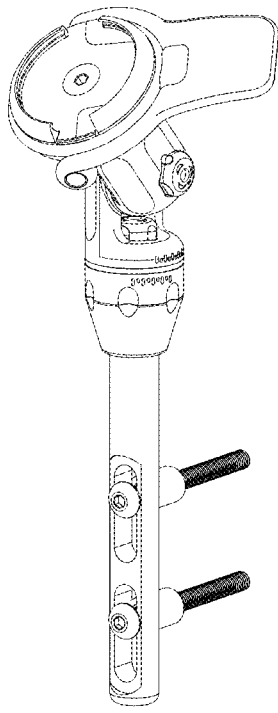

FIG. 17 illustrates a mount 300, for example, for a handle bar, that includes a two-piece clamp, having a clamp member 302 and a base member 304 that includes a dimpled portion 46 to accommodate the indexed adjusting system 40, and FIG. 18 illustrates a one-piece, hinged handle bar mount 400 that, likewise, includes a dimpled portion 46 on the base 402 to accommodate the indexed adjusting system 40. In both FIGS. 17 and 18, sleeves can be used to accommodate handlebars of different diameters. FIG. 19 illustrates the one-piece handlebar mount 400 and mounting system 10 configured to receive the mounting plate 56, such as that used for phones or tablets. FIG. 20 illustrates a ganged mount with a mounting system, FIG. 21 illustrates a suction cup mount with a mounting system, and FIG. 22 illustrates a mount with a mounting system with an extender all also configured to receive the mounting plate 56, such as that used for phones or tablets. Other configurations of mounts with the illustrated components will be appreciated by those skilled in the art and are within the scope and spirit of the present disclosure.

Figures 23, 24A, 24C:
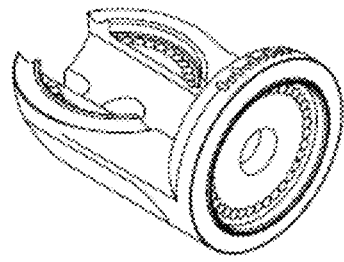
Figures 25A, 25B, 25C, 26:
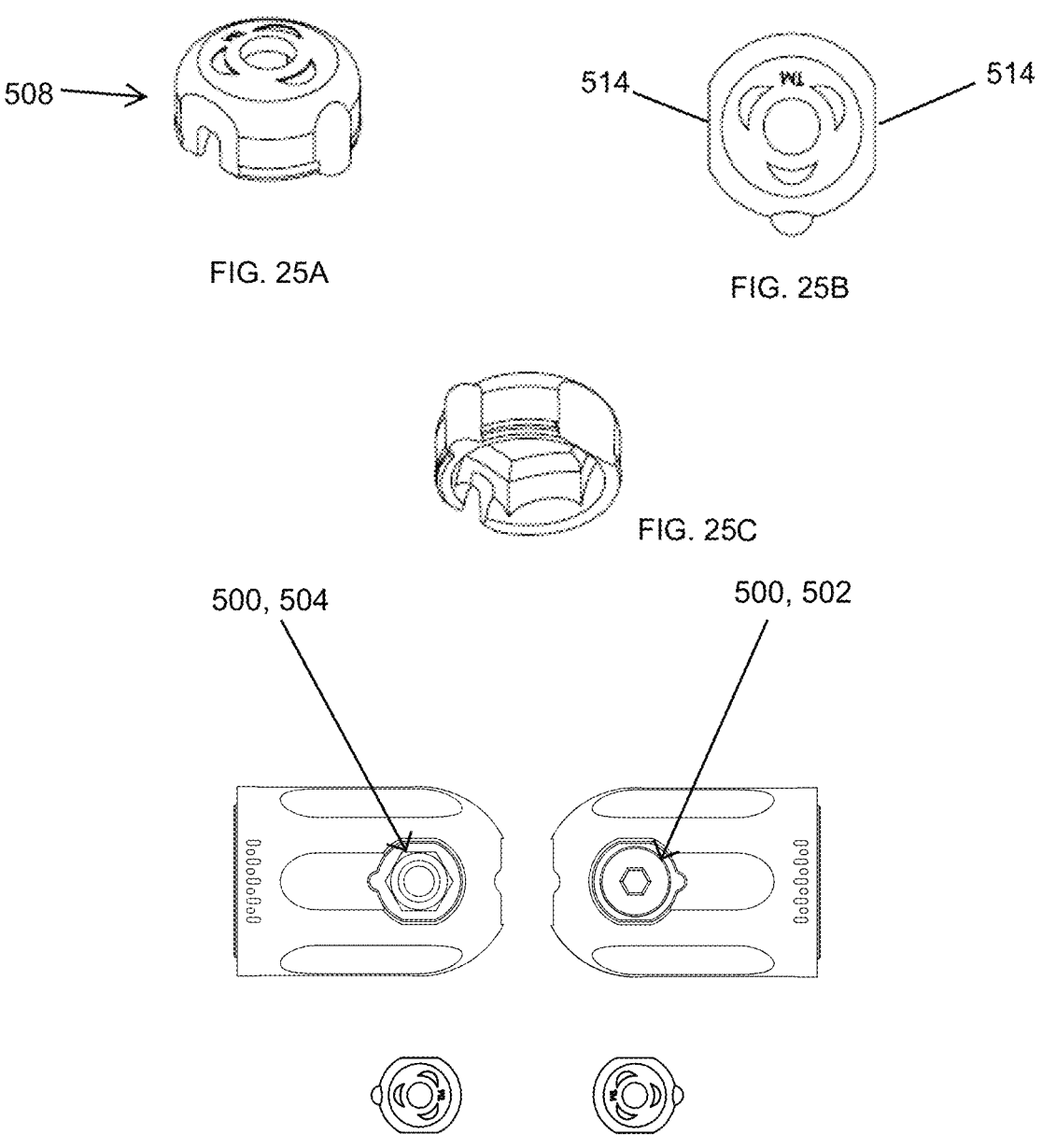
FIGS. 25A-C are various views of an embodiment of the cap.
FIG. 26 is a photograph showing the connector parts disassembled with a button screw and a nut in place in the recesses.

Referring now to FIGS. 24-26, in various of the disclosed embodiments, fasteners 500 are used to secure components to one another with the present mounting system 10 (that is, with the system dimpled portions 46 and projection portions 44). Fasteners can include, for example, a button head screw 502 on one side of the joined components and a nut 504 on the other side of the joined components, an example of which is the buttonhead screw illustrated in the ganged mount of FIG. 20 (which figure shows only the button head screw). Both the screw 502 and the nut 504 are set in recesses 506 formed in the components' bodies. To facilitate readily and reliably tightening and loosening the connection (tightening and loosening the screw 502) to allow for selecting among a smooth friction hold, an indexed friction hold, and a fully locked hold, a cap 508 is configured for positioning over the nut 504 and over the head of the button head screw 502.

In one embodiment, the cap 508 has an other than round shape and the recess 506 into which the cap 508 fits has an other than round shape complementary to the cap 508 shape. In this manner, the cap 508 will not rotate within the recess 506. In addition, an interior shape of the cap 508 can be complementary to the nut 504 (e.g., hexagonal), so that the nut 504 does not rotate within the cap 508. Further, the cap 508 can include a central opening 510 so that a tool, such as an Allen wrench (hex key) can be inserted into the opening 510 to tighten and/or loosen the screw 502. In such a configuration, the screw 502 can be tightened and loosened with its cap 508 in place, the associated nut 504 will not rotate in that it is held in place in the cap 508, and the cap 508 will not rotate relative to the recess 506. In a present embodiment the recesses 506 have two opposing flats 512 and the caps 508 have two opposing complementary, mating flats 514.

It will be appreciated that the present mounting system 10 provides a user numerous and flexible ways to custom-set the position and orientation of items to be mounted to a wide variety of surfaces. The system 10 uses a multitude of joints or linkages to provide full range of motion of the item, and securely mounting the item from a smooth friction hold, to an indexed friction hold, to a fully locked hold, thus enabling the user to set the resistance to their needs whether it is to allow for easy repositioning of the mounted item, or to set the mounted item in a fully locked position.

Such a mounting system 10 can be used for mounting radar detectors, laser detectors, cameras, smartphones, tablets, scientific instrumentation, and the like to vehicle dashboards, handlebars, and other objects. The mounting system 10 can also be used to attach items to free standing objects, such as light fixtures, it can be used to carry cameras or can be configured into adjustable arms that can hold, for example, microphones.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, in is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A mounting system for mounting a device to an object, comprising:

a mount having a fixed portion, and a movable portion, the movable portion slidingly engaged with the fixed portion, the fixed portion and the movable portion defining a base, and when engaged with one another defining a circular profile;

a lever pivotally mounted to the fixed portion so as to operably engage the movable portion in a locked position and operably disengage from the movable portion in an unlocked position;

a connector operably engaged with the fixed portion, to secure the fixed portion to the object;

an indexed adjusting system having a two-sided coin-shaped body having a series of circumferentially equally spaced semi-spherical projections on both sides of the coin-shaped body, a first series of circumferentially equally spaced dimples positioned on the fixed portion, a second series of circumferentially equally spaced dimples positioned on the connector, the circumferentially equally spaced semi-spherical projections on both sides of the coin-shaped body configured to engage the circumferentially equally spaced dimples positioned on the fixed portion and the connector, respectively;

a resilient member positioned between the fixed portion and the connector, circumferentially outward of the two-sided coin shaped body; and a fastener for engaging the fixed portion and the connector, wherein a low torque on the fastener permits a smooth friction hold between the mount and the connector, a medium torque on the fastener permits an indexed friction hold between the mount and the connector, the index friction hold being partial engagement of semi-spherical projections and the dimples, and a high torque on the fastener is a fully locked condition of the mount and the connector with full engagement of the semi-spherical projections and the dimples.

2. The mounting system of claim 1, wherein each dimple of the circumferentially equally spaced dimples are positioned about 10 degrees from adjacent dimples and wherein each projection of the circumferentially equally spaced semi-spherical projections are positioned about 10 degrees from adjacent projections.

3. The mounting system of claim 1, wherein the resilient member is an O-ring.

4. The mounting system of claim 1, wherein the fixed portion and the movable portion mount each include at least one upwardly, inwardly oriented flange.

5. The mounting system of claim 4, further including a mounting plate, the mounting plate including outwardly oriented fingers configured for engagement with the fixed portion and movable portion upwardly, inwardly oriented flanges to secure the mounting plate to the fixed and/or movable portions.

6. The mounting system of claim 5, wherein the mounting plate is configured for attachment to an associated mobile device.

7. The mounting system of claim 1, wherein one or both of the fixed portion and the movable portion includes a magnetic surface.

8. The mounting system of claim 1, wherein the resilient member is a first resilient member.

9. The mounting system of claim 8, wherein the fixed portion and the movable portion, when engaged with one another define a circumferential recess, and further including a second resilient member positioned in the recess, wherein when the lever operably engages the movable portion in the locked position, the lever engages and exerts a force on the second resilient member, and wherein when the lever operably disengages the movable portion in the unlocked position, the lever disengages from the second resilient member.

10. The mounting system of claim 1, further including a dampener, wherein the connector is a dampener.

11. The mounting system of claim 10, wherein the mount and the dampener are separate members.

12. The mounting system of claim 1, wherein the connector is a linkage.

13. The mounting system of claim 1, wherein the connector is a ganged mount, and wherein a base portion of the ganged mount further includes a dimpled portion to accommodate the indexed adjusting system.

14. The mounting system of claim 1, wherein the connector is an extender, and wherein the extender includes a dimpled portion to accommodate the indexed adjusting system.

15. The mounting system of claim 1, wherein the connector is a handlebar mount.

16. The mounting system of claim 15, wherein the handlebar mount include a hinged clamp.

17. The mounting system of claim 15, wherein the handlebar mount includes a two-piece clamp.

18. The mounting system of claim 1, wherein the connector further includes first and second portions an indexed adjusting system between the first and second portions, the first and second portions mounted to one another by a screw having a head and a nut, positioned in recesses in the first and second portions, respectively.

19. The mounting system of claim 18, wherein the recesses in one or both of the first and second portions are an other than round shape, and further including a cap positioned over one or both of the screw head and the nut.

20. The mounting system of claim 19, wherein the cap on the screw head has an opening therein to rotate the screw with the cap in place.

\* \* \* \* \*